United States Patent
Bidgoli et al.

(10) Patent No.: US 10,742,487 B2
(45) Date of Patent: Aug. 11, 2020

(54) BORDER ROUTERS IN MULTICAST NETWORKS AND METHODS OF OPERATING THE SAME

(71) Applicant: Nokia Technologies OY, Espoo (FI)

(72) Inventors: Hooman Bidgoli, Ottawa (CA); Georges Chung Kam Chung, Nepean (CA)

(73) Assignee: Nokia Technologies Oy, Espoo (FI)

(*) Notice: Subject to any disclaimer, the term of this patent is extended or adjusted under 35 U.S.C. 154(b) by 72 days.

(21) Appl. No.: 15/945,942

(22) Filed: Apr. 5, 2018

(65) Prior Publication Data

US 2019/0312770 A1 Oct. 10, 2019

(51) Int. Cl.
  *H04L 12/24* (2006.01)
  *H04L 12/741* (2013.01)
  *H04L 12/18* (2006.01)

(52) U.S. Cl.
  CPC .......... *H04L 41/0654* (2013.01); *H04L 12/18* (2013.01); *H04L 45/74* (2013.01)

(58) Field of Classification Search
  CPC ...... H04L 41/0654; H04L 12/18; H04L 45/74
  See application file for complete search history.

(56) References Cited

U.S. PATENT DOCUMENTS

| | | |
|---|---|---|
| 7,684,316 B2 | 3/2010 | Filsfils et al. |
| 7,826,348 B2 | 11/2010 | Farinacci et al. |
| 2007/0253416 A1* | 11/2007 | Raj .......................... H04L 45/02 370/390 |
| 2008/0225697 A1 | 9/2008 | Bryant et al. |
| 2012/0281539 A1 | 11/2012 | Patel et al. |
| 2014/0283029 A1 | 9/2014 | Chandrasekaran et al. |

FOREIGN PATENT DOCUMENTS

| | | |
|---|---|---|
| EP | 2750342 A2 | 7/2014 |
| EP | 3002913 A1 | 4/2016 |
| EP | 3151489 A1 | 4/2017 |

OTHER PUBLICATIONS

International Search Report and Written Opinion dated May 8, 2019 in International Application No. PCT/FI2019/050182.

(Continued)

*Primary Examiner* — Jackie Zuniga Abad
(74) *Attorney, Agent, or Firm* — Harness, Dickey & Pierce, P.L.C.

(57) ABSTRACT

A border router includes at least one processor and at least one memory including computer program code. The at least one memory and the computer program code is configured to, with the at least one processor, cause the border router to: identify, in response to receiving a label mapping message from a network node, a backup border router as a hop in a backup path between a leaf node and a root node in a multicast network including an autonomous system, the label mapping message including a type-length-value; determine whether the backup border router is an originating border router having generated the label mapping message based on the type-length-value; and suppress mapping of the hop in the backup path in response to determining that the backup border router is the originating border router.

17 Claims, 5 Drawing Sheets

(56) References Cited

OTHER PUBLICATIONS

Zhang, J. et al. "A LDP Fast Protection Switching Scheme for Concurrent Multiple Failures in MPLS Network", 2009 International Conference on Multimedia Information Networking and Security IEEE, [online], Nov. 18, 2009, <https://ieeexplore.ieee.org/document/5370083>.
L. Andersson, et al., "LDP Specification", Network Working Group, IETF RFC 5036, Oct. 1, 2007, <https://tools.ietf.org/pdf/rfc5036.pdf>.
Karan et. al. 'Multicast-Only Fast Reroute'. Internet Engineering Task Force (IETF) pp. 01-14, Aug. 2015.

\* cited by examiner

BORDER ROUTERS IN MULTICAST NETWORKS AND METHODS OF OPERATING THE SAME

TECHNICAL FIELD

One or more example embodiments relate to multicast networks configured for Multicast-only Fast Re-Route (MoFRR).

BACKGROUND

Multicast only Fast Re-Route (MoFRR) provides primary and backup paths for multicast streams between a root node and a leaf node within an autonomous system (AS). The root node streams multicast content toward the leaf node on both the primary and backup paths, but the leaf node and all the intermediate nodes only listen to the primary path while dropping (discarding) redundant packets received on the backup path until a failure necessitates listening to the backup path. Autonomous system boundary router (ASBR) MoFRR takes this concept a step further, wherein the multicast stream is protected via a primary and backup autonomous system boundary router. As such, two multicast streams are transmitted to the leaf node, one from a primary autonomous system boundary router and another from a backup autonomous system boundary router. The leaf node listens to the primary autonomous system boundary router while dropping the redundant traffic from the backup autonomous system boundary router.

SUMMARY

One or more example embodiments relate to methods, apparatuses and non-transitory computer-readable mediums for suppressing loops between indirectly-connected routers (e.g., border routers, such as area border routers (ABRs), autonomous system boundary routers (ASBRs), or the like) in multicast networks configured for Multicast-only Fast Re-Route (MoFRR).

At least one example embodiment provides a border router (e.g., in an autonomous system). The border router includes at least one processor and at least one memory including computer program code. The at least one memory and the computer program code is configured to, with the at least one processor, cause the border router to: identify, in response to receiving a label mapping message from a network node, a backup border router as a hop in a backup path between a leaf node and a root node in a multicast network including an autonomous system, the label mapping message including a type-length-value; determine whether the backup border router is an originating border router having generated the label mapping message based on the type-length-value; and suppress mapping of the hop in the backup path in response to determining that the backup border router is the originating border router.

According to at least some example embodiments, the at least one memory and the computer program code may be further configured to, with the at least one processor, cause the border router to: examine the type-length-value to identify a system address of the originating border router; and determine whether the backup border router is the originating border router based on a comparison between the system address of the originating border router and a system address of the backup border router.

The at least one memory and the computer program code may be further configured to, with the at least one processor, cause the border router to: determine that a system address of the originating border router matches a system address of the backup border router; and determine that the backup border router is the originating border router in response to determining that the system address of the originating border router matches the system address of the backup border router.

The type-length-value may include the system address of the originating border router, and the at least one memory and the computer program code are further configured to, with the at least one processor, cause the border router to examine the type-length-value to determine the system address of the originating border router.

The at least one memory and the computer program code may be further configured to, with the at least one processor, cause the border router to: identify, in response to receiving the label mapping message, a primary border router as a hop in a primary path between the leaf node and the root node in the multicast network; and send a label mapping message to only the primary border router from among the primary border router and the backup border router.

The at least one memory and the computer program code may be further configured to, with the at least one processor, cause the border router to map the hop of the backup path in response to determining that the backup border router is not the originating border router.

The at least one memory and the computer program code may be further configured to, with the at least one processor, cause the border router to: identify, in response to receiving the label mapping message, a primary border router as a hop in a primary path between the leaf node and the root node in the multicast network; send a first label mapping message to the primary border router to map the hop in the primary path; and send a second label mapping message to the backup border router to map the hop in the backup path.

At least one other example embodiment provides a method comprising: identifying, in response to receiving a label mapping message from a network node, a backup border router as a hop in a backup path between a leaf node and a root node in a multicast network including an autonomous system, the label mapping message including a type-length-value; determining whether the backup border router is an originating border router having generated the label mapping message based on the type-length-value; and suppressing mapping of the hop in the backup path in response to determining that the backup border router is the originating border router.

At least one other example embodiment provides a non-transitory computer-readable storage medium including program instructions for causing a border router to perform at least: identifying, in response to receiving a label mapping message from a network node, a backup border router as a hop in a backup path between a leaf node and a root node in a multicast network including an autonomous system, the label mapping message including a type-length-value; determining whether the backup border router is an originating border router having generated the label mapping message based on the type-length-value; and suppress mapping of the hop in the backup path in response to determining that the backup border router is the originating border router.

According to at least some example embodiments, the method may further include: examining the type-length-value to identify a system address of the originating border router; and wherein the determining determines whether the backup border router is the originating border router based on a comparison between the system address of the originating border router and a system address of the backup border router.

The determining may include: determining that a system address of the originating border router matches a system address of the backup border router; and determining that the backup border router is the originating border router in response to determining that the system address of the originating border router matches the system address of the backup border router.

The type-length-value includes the system address of the originating border router, and the method may further include examining the type-length-value to determine the system address of the originating border router.

The method may further include: identifying, in response to receiving the label mapping message, a primary border router as a hop in a primary path between the leaf node and the root node in the multicast network; and sending a label mapping message to only the primary border router from among the primary border router and the backup border router.

The method may further include mapping the hop of the backup path in response to determining that the backup border router is not the originating border router.

At least one other example embodiment provides a border router comprising: means for identifying, in response to receiving a label mapping message from a network node, a backup border router as a hop in a backup path between a leaf node and a root node in a multicast network including an autonomous system, the label mapping message including a type-length-value; means for determining whether the backup border router is an originating border router having generated the label mapping message based on the type-length-value; and means for suppressing mapping of the hop in the backup path in response to determining that the backup border router is the originating border router.

According to at least some example embodiments, the border router may further include: means for examining the type-length-value to identify a system address of the originating border router; and wherein the means for determining determines whether the backup border router is the originating border router based on a comparison between the system address of the originating border router and a system address of the backup border router.

The means for determining may include: means for determining that a system address of the originating border router matches a system address of the backup border router; and means for determining that the backup border router is the originating border router in response to determining that the system address of the originating border router matches the system address of the backup border router.

The type-length-value includes the system address of the originating border router, and the border router may further include means for examining the type-length-value to determine the system address of the originating border router.

The border router may further include: means for identifying, in response to receiving the label mapping message, a primary border router as a hop in a primary path between the leaf node and the root node in the multicast network; and means for sending a label mapping message to only the primary border router from among the primary border router and the backup border router.

The border router may further include means for mapping the hop of the backup path in response to determining that the backup border router is not the originating border router.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
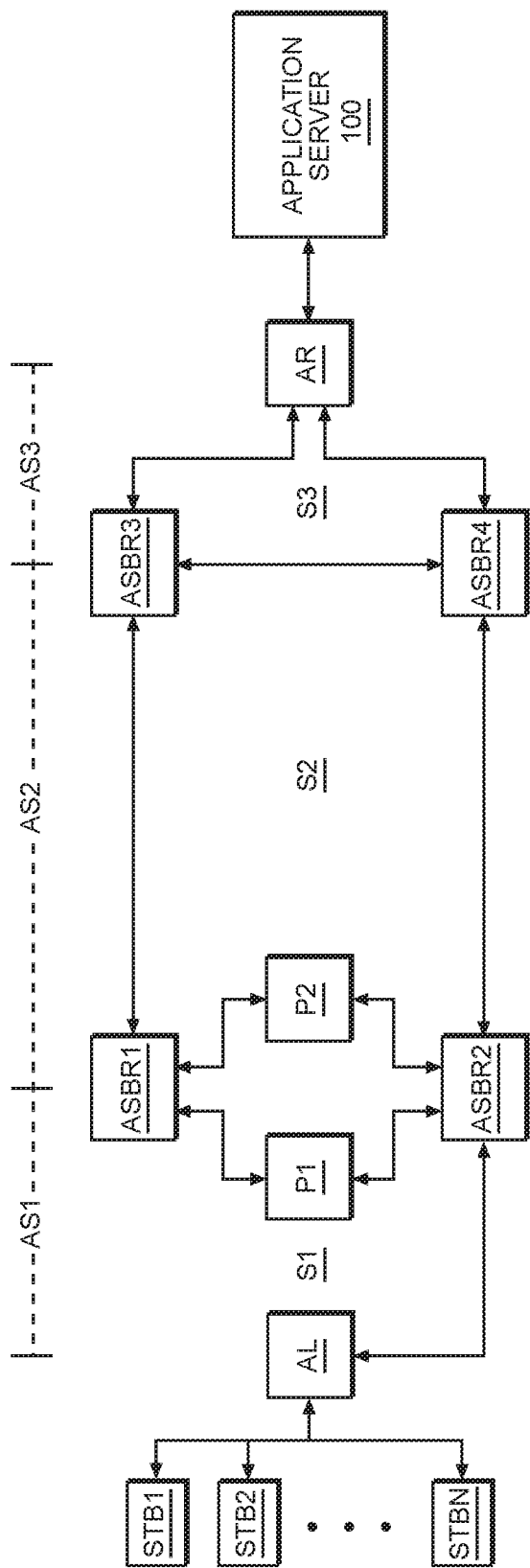
FIG. 1 is a block diagram illustrating an example multicast network including multiple autonomous systems.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, it should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Example embodiments will be discussed herein with regard to an inter-autonomous system (inter-AS) case and autonomous system boundary routers (ASBRs). However, example embodiments should not be limited to the examples discussed herein. Rather, example embodiments are equally applicable to the intra-AS case. In this regard, the same or similar methodology may be applied at area border routers (ABRs) located at or near borders between, for example, one or more Open Shortest Path First (OSPF) areas. As discussed herein, an autonomous system boundary router and an area border router may sometimes be referred to collectively as a "router" or "border router."

As mentioned above, Multicast only Fast Re-Route (MoFRR) provides primary and backup paths for multicast streams between a root node (also sometimes referred to as a "root") and a leaf node (also sometimes referred to as a "leaf") within an autonomous system. The root node streams multicast content toward the leaf node on both the primary and backup paths, but the leaf node and all the intermediate nodes only listen to the primary path while dropping (discarding) redundant packets received on the backup path until, for example, a failure or other malfunction, necessitates listening to the backup path.

In an intra-AS case (within an autonomous system), a leaf node requesting multicast content from the root node signals the primary path to a primary area border router and the backup path to a backup area border router. The area border router then sets up a primary path and a backup path to other area border routers towards the root node.

In an inter-AS case (between autonomous systems) of ASBR MoFRR, a leaf node requesting multicast content from the root node signals the primary path to a primary autonomous system boundary router and the backup path to a backup autonomous system boundary router. The autonomous system boundary router then sets up a primary path and a backup path to other autonomous system boundary routers towards the root node.

When using ASBR MoFRR, a loop may occur when a first autonomous system boundary router is the backup path (or backup local root (BLR)) for a second autonomous system boundary router, and the second autonomous system boundary router is the backup path (or BLR) for the first autonomous system boundary router. In this instance, the first and second autonomous system boundary routers may be using each other as a backup, without a downstream leaf node. As a result, the root node may, for example, unnecessarily waste bandwidth by sending traffic to these autonomous system boundary routers when there is no downstream leaf node.

Similarly, a loop may occur when a first area border router is the backup path (or backup local root (BLR)) for a second area border router, and the second area border router is the backup path (or BLR) for the first area border router. In this instance, the first and second area border routers may be using each other as a backup, without a downstream leaf node. As a result, the root node may, for example, unnecessarily waste bandwidth by sending traffic to these area border routers when there is no downstream leaf node.

An autonomous system boundary router (or area border router) may detect a loop using the Label Distribution Protocol (LDP) when the directly-connected downstream peer between the autonomous system boundary router (or area border router) is the same as the directly-connected upstream peer. In some cases, however, there may be multiple provider routers (P-routers) between the autonomous system boundary routers (or area border routers) meaning that the autonomous system boundary routers (or area border routers) are not directly connected (indirectly connected) to one another. In this instance, undesirable loops may not be detectable.

One or more example embodiments provide a manner in which a border router (e.g., an autonomous system boundary router, area border router, or the like) may identify itself to a peer border router to which it is (e.g., only) indirectly connected. Using this information, the peer border router is able to detect a loop, and suppress or break the loop as necessary or desired. By identifying and suppressing or breaking an undesirable loop, network congestion may be reduced by reducing bandwidth wasted by the root node when sending traffic to autonomous system boundary routers without a downstream leaf node. Additionally, or alternatively, by identifying and suppressing or breaking an undesirable loop, processing and/or memory resources may be saved (e.g., not unnecessarily wasted) by reducing traffic received at the autonomous system boundary routers without a downstream node. Still further, because tunnels are limited/finite resources at a given node, one or more example embodiments may also reduce the likelihood of multicast functionality being unusable due to lack of resources.

In one example, the border router identifies itself to the peer border router by including a unique address for the border router in the label mapping message sent to establish the backup path (also referred to as a backup path hop or hop in the backup path) between the border routers. In at least one example embodiment, the unique address may be a unique system-wide address (e.g., an IP address, or the like), and may be included in a type-length-value (TLV). The TLV is included with a label mapping message sent to a border router to signal and establish the backup path.

As mentioned above, example embodiments will be discussed herein with regard to an inter-autonomous system (inter-AS) case and autonomous system boundary routers (ASBRs). However, example embodiments may be equally applicable to the intra-AS case. In this regard, the same or similar methodology may be applied at area border routers.

FIG. 1 is a block diagram illustrating an example multicast network including multiple autonomous systems. The network shown in FIG. 1 is a multicast network configured for ASBR MoFRR.

Referring to FIG. 1, the multicast network includes a plurality of autonomous systems AS1, AS2 and AS3 between a leaf node AL and a root node AR.

In this example, the leaf node AL is a Multicast Egress node (MCE) coupled to multicast clients (e.g., set-top boxes, or the like) STB1, STB2, . . . STBN configured to receive multicast content (e.g., multimedia content, such as audio and/or video). In one example, the MCE may be a customer premises equipment (CPE), such as a cable modem termination system (CMTS) in the case of a Data Over Cable Service Interface Specification (DOCSIS) network, an Optical Line Terminal (OLT) in the case of Gigabit Passive Optical Network (GPON), or the like.

The root node AR is a Multicast Ingress node (MCI), which is the node from which a multicast stream enters the network for transport to the leaf node AL. In the example embodiment shown in FIG. 1, the root node AR is coupled to an application server 100 that serves as the multicast source node providing multicast content. However, it should be understood that the root note AR may also be regarded as the multicast source itself. In this case, the application server 100 may be omitted or be part of the root node AR.

In the network shown in FIG. 1, communication paths between the leaf node AL and the root node AR may traverse the plurality of autonomous systems AS1, AS2 and AS3, which are connected by transit nodes referred to as autonomous system boundary routers (ASBRs) positioned at the boundaries between the autonomous systems AS1, AS2 and AS3. In one example, each autonomous system may correspond to a different service provider's network. In another example, each autonomous system may correspond to an "island" within a single service provider's network.

In the example embodiment shown in FIG. 1, autonomous system boundary routers ASBR1 and ASBR2 are at the boundary between (and connect) autonomous systems AS1 and AS2, and autonomous system boundary routers ASBR3 and ASBR4 are at the boundary (and connect) autonomous systems AS2 and AS3.

Each of the autonomous systems AS1, AS2 and AS3 may also include one or more other network nodes, such as switches, routers, or the like. In the example shown in FIG. 1, autonomous system AS1 includes provider router (P-router) P1 coupled to autonomous system boundary routers ASBR1 and ASBR2, and autonomous system AS2 includes P-router P2 also connecting autonomous system boundary routers ASBR1 and ASBR2. In this regard, the autonomous system boundary routers ASBR1 and ASBR2 may be indirectly connected to one another via P-routers P1 and P2.

The P-routers P1 and P2 may be label switch routers (LSRs).

In the example shown in FIG. 1, the path between the root node AR and the leaf node AL may be partitioned into network segments S1, S2 and S3. In some cases, a network segment may correspond to an autonomous system. The root node AR is the actual root and the leaf node AL is the actual leaf for the path between the nodes, but each of the autonomous system boundary routers ASBR1, ASBR2, ASBR3 and ASBR4 may also serve as a local root (and/or local leaf) for multicast traffic in a given segment.

In the example shown in FIG. 1, the autonomous system boundary router ASBR2 may serve as a local root for multicast traffic sent to the leaf node AL in segment S1, and also as a local leaf for multicast traffic received from local root nodes in segment S2. Similarly, each of autonomous system boundary routers ASBR3 and ASBR4 may serve as a local root for multicast traffic sent to local leaf nodes in segment S2, and also as a local leaf for multicast traffic received from the root node AR in segment S3.

Example operation of the network shown in FIG. 1 will be discussed in more detail below with regard to FIGS. 2 and 3.

Figure 2:
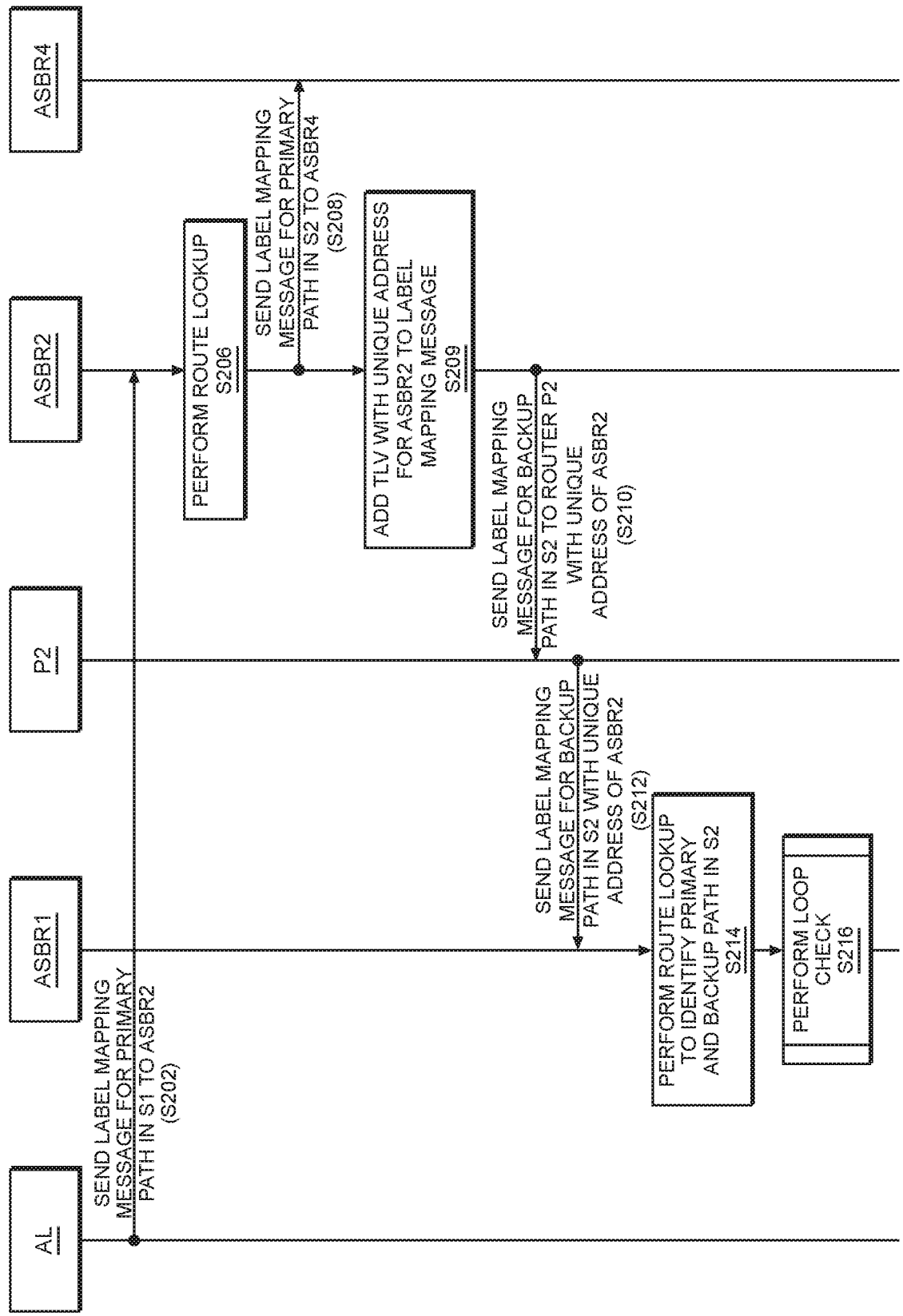
FIG. 2 is a signal flow diagram illustrating a method according to an example embodiment.

FIG. 2 is a signal flow diagram illustrating a method according to an example embodiment. Although discussed with regard to certain nodes within the network shown in FIG. 1, it should be understood that similar methodologies apply to other network elements not specifically described herein. For example, the method shown in FIG. 2 may also be implemented in connection with area border routers (ABRs).

When the leaf node AL receives a join message (e.g., Internet Group Management Protocol (IGMP) join message) from one or more multicast clients (e.g., set-top boxes or the like) STB1, STB2, . . . STBN requesting a multicast stream from the root node AR, the leaf node AL performs a route lookup procedure (e.g., using a route lookup table) to determine a primary local root (and primary path, also referred to as a primary path hop or hop in the primary path). For example purposes, the example shown in FIG. 2 will be discussed with regard to the leaf node AL identifying the autonomous system boundary router ASBR2 as the primary local root (PLR) in the first segment S1. The PLR serves as the primary path for LSPs received at an autonomous system boundary router (or other node).

Referring to FIG. 2, after identifying the autonomous system boundary router ASBR2 as the PLR, at S202 the leaf node AL sends a label mapping message to the autonomous system boundary router ASBR2 to establish the autonomous system boundary router ASBR2 as the PLR for the primary path between the root node AR and the leaf node AL in the first segment S1.

The label mapping messages may be multicast LDP (mLDP) label mapping messages. Although example embodiments will be discussed herein with regard to mLDP, in one or more alternative example embodiments, Generic Routing Encapsulation (GRE), Point-to-Multipoint (P2MP) Resource Reservation Protocol-Traffic Engineering (RSVP-TE), or the like, may be used.

In response to receiving the label mapping message from the leaf node AL, at S206 the autonomous system boundary router ASBR2 (as a local leaf) performs route lookup for the address of the root node AR to identify primary and backup paths (a PLR and a BLR) to the autonomous system boundary router (ASBRs) in the second segment S2. In this example, the autonomous system boundary router ASBR2 identifies the autonomous system boundary router ASBR4 as the PLR for the primary path towards the root node AR in the second segment S2, and identifies the autonomous system boundary router ASBR1 as the BLR for the backup path towards the root node AR in the second segment S2.

At S208, the autonomous system boundary router ASBR2 sends a label mapping message to the autonomous system boundary router ASBR4 to establish the autonomous system boundary router ASBR4 as the PLR for the primary path towards the root node AR in the second segment S2.

At S209, the autonomous system boundary router ASBR2 adds a TLV including the unique address (e.g., a unique system-wide address, such as an IP address, or the like) of the autonomous system boundary router ASBR2 to the label mapping message to be used to establish the autonomous system boundary router ASBR1 as the BLR for the backup path towards the root node AR. The addition of the TLV in the label mapping message for the backup path identifies the autonomous system boundary router ASBR2 as the origination point of signaling for this backup next-hop in the second segment S2. This autonomous system boundary router may also be referred to as the originating autonomous system boundary router or originating border router.

According to one or more example embodiments, the addition of the TLV may be a local configuration at an autonomous system boundary router (or other router), or may be a network wide behavior, in which each router sends this TLV as along with (or as its) label mapping message.

Still referring to FIG. 2, at S210 the autonomous system boundary router ASBR2 sends a label mapping message including the TLV to the P-router P2 between the autonomous system boundary router ASBR2 and the autonomous system boundary router ASBR1.

In response to receiving the label mapping message from the autonomous system boundary router ASBR2, at S212 the P-router P2 sends a label mapping message to the autonomous system boundary router ASBR1. In this example, the P-router P2 is a label switch router (LSR), which forwards this (optional) TLV information received from the autonomous system boundary router ASBR2 in its label mapping being sent towards autonomous system boundary router ASBR1.

In response to receiving the label mapping message from the P-router P2, at S214 the autonomous system boundary router ASBR1 performs a route lookup for the address of the root node AR to identify primary and backup paths (a PLR and a BLR) towards the root node AR in the second segment S2. In the example shown in FIG. 2, the ASBR1 identifies the autonomous system boundary router ASBR3 as the PLR for the primary path towards the root node AR and the autonomous system boundary router ASBR2 as the BLR for the backup path towards the root node AR.

After identifying the primary path and backup path in response to the label mapping message from the P-router P2, at S216 the autonomous system boundary router ASBR1 performs a loop check procedure to determine whether the identified backup path in which the autonomous system boundary router ASBR2 is the BLR will result in an undesirable loop.

The loop check procedure will be discussed in more detail below with regard to FIG. 3.

Figure 3:
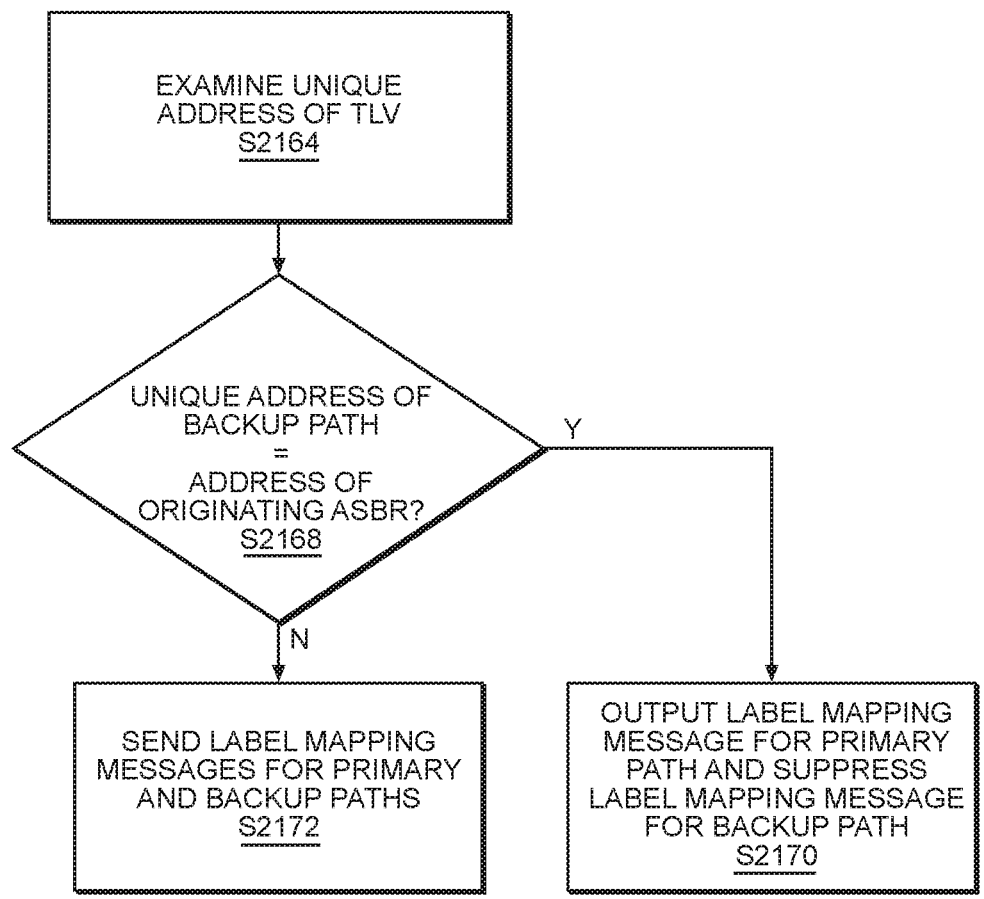
FIG. 3 is a flow chart illustrating another method according to an example embodiment.

FIG. 3 is a flow chart illustrating an example embodiment of the loop check method.

Referring to FIG. 3, at S2164 the autonomous system boundary router ASBR1 examines the TLV included in the label mapping message received from the P-router P2 to obtain the unique address of the originating autonomous system boundary router from which the path signaling originated.

At step S2168, the autonomous system boundary router ASBR1 compares the unique address obtained from the TLV with the unique address of the autonomous system boundary router ASBR2, which was identified as the BLR for the backup path at S214 in FIG. 2. In one example, if the unique address is an IP address, then the comparison at S2168 may include comparing an IP address of the autonomous system boundary router ASBR2 with an IP address obtained from the TLV received at S212.

If the unique address obtained from the TLV matches the unique address of the autonomous system boundary router ASBR2, which was identified as the BLR at S214 in FIG. 2, then at S2170 the autonomous system boundary router ASBR1 outputs a label mapping message for the primary path to the autonomous system boundary router ASBR3, but does not send a label mapping message for the backup path to the autonomous system boundary router ASBR2, thereby suppressing or breaking an undesirable loop between the autonomous system boundary routers ASBR1 and ASBR2.

In the example discussed above with regard to FIG. 2, since the autonomous system boundary router ASBR2 is the origination point of the backup path signaling received from the P-router P2, and also identified as the BLR for the backup path by the autonomous system boundary router ASBR1 at S214, the autonomous system boundary router ASBR1 determines that the unique address obtained from the TLV matches the unique address of the autonomous system boundary router identified as the BLR for the backup path by the autonomous system boundary router ASBR1 at S214. In this case, at S2170 the autonomous system boundary router ASBR1 outputs a label mapping message for the primary path to the autonomous system boundary router ASBR3, but does not send the label mapping message for the backup path to the autonomous system boundary router ASBR2. In so doing, the autonomous system boundary router ASBR1 may not establish a backup path for multicast traffic (and LSPs) received at the autonomous system boundary router ASBR1.

Returning to S2168 in FIG. 3, if the unique address obtained from the TLV does not match (is different from) the unique address of the autonomous system boundary router ASBR2, which was identified as the BLR for the backup path at S214, then at S2172 the autonomous system boundary router ASBR1 outputs a label mapping message for the primary path to the autonomous system boundary router ASBR3, and outputs a label mapping message for the backup path to the autonomous system boundary router ASBR2.

Once the primary and backup paths between the leaf node AL and the root node AR have been established, the leaf node AL receives the requested multicast traffic via the established primary path and (if applicable in response to, e.g., failure in the network) the established backup path.

Figure 4:
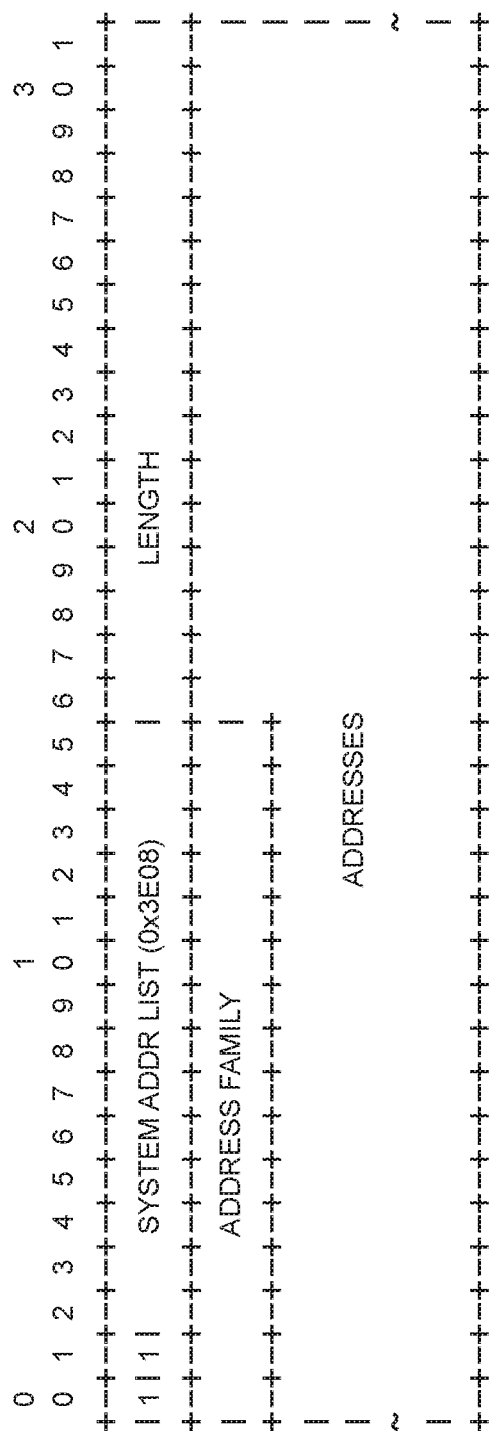
FIG. 4 illustrates an example type-length-value (TLV) for label mapping according to an example embodiment.

FIG. 4 illustrates an example TLV for label mapping according to an example embodiment. A label mapping message may include two of the TLVs (e.g., IPv4 and IPv6) shown in FIG. 4.

In at least this example, the U-bit may be set to 1 to indicate that an unknown TLV should be silently ignored and the rest of the message processed as if the unknown TLV did not exist.

The F-bit may be set to 1 so that the unknown TLV is forwarded by any intermediate nodes (e.g., P-routers or the like) with the containing message.

In addition to the information included in conventional TLVs, the TLV shown in FIG. 4 further includes the unique address (e.g., a unique system-wide address, such as an IP address, or the like) of the originating autonomous system boundary router (or, more generally, border router) to identify the node (e.g., the originating autonomous system boundary router or originating border router) having originated the label mapping message to establish the path through the network.

Although discussed herein with regard to an IP address as a system-wide address, example embodiments should not be limited to this example. Rather, any unique identifier usable by other autonomous system boundary routers to identify the sender autonomous system boundary router may be used.

Figure 5:
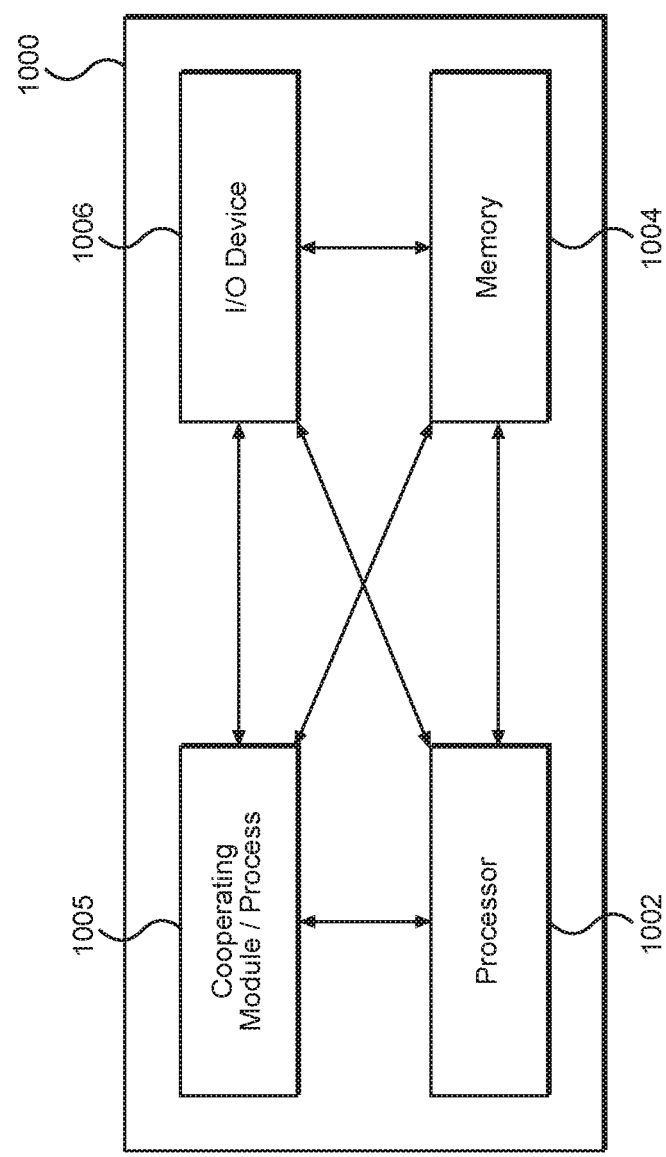
FIG. 5 provides a general architecture and functionality suitable for implementing functional elements, or portions of functional elements, described herein.

FIG. 5 depicts a high-level block diagram of a computer or computing device suitable for use in implementing, for example, the autonomous system boundary routers ASBR1, ASBR2, ASBR3, ASBR4. Although not specifically described herein, the general architecture and functionality shown in FIG. 5 may also be suitable for implementing one or more of the set-top boxes, leaf nodes, root nodes, routers, area border routers, or the like.

Referring to FIG. 5, the computer 1000 includes one or more processors 1002 (e.g., a central processing unit (CPU) or other suitable processor(s)) and a memory 1004 (e.g., random access memory (RAM), read only memory (ROM), and the like). The computer 1000 also may include a cooperating module/process 1005. The cooperating process 1005 may be loaded into memory 1004 and executed by the processor 1002 to implement functions as discussed herein and, thus, cooperating process 1005 (including associated data structures) may be stored on a computer readable storage medium (e.g., RAM memory, magnetic or optical drive or diskette, or the like).

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

While one or more example embodiments will be described from the perspective of the autonomous system boundary routers, area border routers, multicast clients, or other nodes, it will be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a border router (e.g., an autonomous system boundary router, area border router, or the like) to perform the operations discussed herein.

It will be appreciated that a number of the embodiments may be used in combination.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing multicast clients, routers, gateways, nodes, autonomous system boundary routers, computers, cloud-based servers, web servers, application servers, proxies or proxy servers, or the like. As discussed later, such existing hardware may be processing entities including, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an autonomous system boundary router (or area border router) to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, multicast clients, routers, gateways, nodes, autonomous system boundary routers, area border routers, computers, cloud-based servers, web servers, application servers, proxies or proxy servers, or the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The multicast clients, routers, gateways, nodes, autonomous system boundary routers, area border routers, computers, cloud-based servers, web servers, application servers, proxies or proxy servers, or the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as multicast clients, gateways, nodes, routers, autonomous system boundary routers, area border routers, computers, cloud-based servers, web servers, application servers, proxies or proxy servers.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A border router comprising:
   at least one processor; and
   at least one memory including computer program code, the at least one memory and the computer program code configured to, with the at least one processor, cause the border router to
      identify, in response to receiving a label mapping message from a network node, a backup border router as a hop in a backup path between a leaf node and a root node in a multicast network including an autonomous system, the label mapping message including a type-length-value,
      determine whether the backup border router is an originating border router having generated the label mapping message based on the type-length-value, the backup border router being separate from the border router, and
      suppress mapping of the hop in the backup path in response to determining that the backup border router is the originating border router, wherein
         the type-length-value includes a system address of the originating border router, and
         the at least one memory and the computer program code are further configured to, with the at least one processor, cause the border router to examine the type-length-value to determine the system address of the originating border router.

2. The border router of claim 1, wherein the at least one memory and the computer program code are further configured to, with the at least one processor, cause the border router to
   determine whether the backup border router is the originating border router based on a comparison between the system address of the originating border router and a system address of the backup border router.

3. The border router of claim 1, wherein the at least one memory and the computer program code are further configured to, with the at least one processor, cause the border router to
   determine that the system address of the originating border router matches a system address of the backup border router; and
   determine that the backup border router is the originating border router in response to determining that the system address of the originating border router matches the system address of the backup border router.

4. The border router of claim 1, wherein the at least one memory and the computer program code are further configured to, with the at least one processor, cause the border router to
   identify, in response to receiving the label mapping message, a primary border router as a hop in a primary path between the leaf node and the root node in the multicast network; and
   send a label mapping message to only the primary border router from among the primary border router and the backup border router.

5. The border router of claim 1, wherein the at least one memory and the computer program code are further configured to, with the at least one processor, cause the border router to map the hop of the backup path in response to determining that the backup border router is not the originating border router.

6. The border router of claim 5, wherein the at least one memory and the computer program code are further configured to, with the at least one processor, cause the border router to
   identify, in response to receiving the label mapping message, a primary border router as a hop in a primary path between the leaf node and the root node in the multicast network;
   send a first label mapping message to the primary border router to map the hop in the primary path; and
   send a second label mapping message to the backup border router to map the hop in the backup path.

7. A method performed at a border router, the method comprising:
   identifying, in response to receiving a label mapping message from a network node, a backup border router as a hop in a backup path between a leaf node and a root node in a multicast network including an autonomous system, the label mapping message including a type-length-value, the type-length-value including a system address of an originating border router having generated the label mapping message;
   examining the type-length-value to determine the system address of the originating border router;
   determining whether the backup border router is the originating border router based on the type-length-value; and
   suppressing mapping of the hop in the backup path in response to determining that the backup border router is the originating border router, wherein
      the backup border router is separate from the border router.

8. The method of claim 7,
   wherein the determining determines whether the backup border router is the originating border router based on a comparison between the system address of the originating border router and a system address of the backup border router.

9. The method of claim 7, wherein the determining comprises:
   determining that the system address of the originating border router matches a system address of the backup border router; and
   determining that the backup border router is the originating border router in response to determining that the system address of the originating border router matches the system address of the backup border router.

10. The method of claim 7, further comprising:
    identifying, in response to receiving the label mapping message, a primary border router as a hop in a primary path between the leaf node and the root node in the multicast network; and
    sending a label mapping message to only the primary border router from among the primary border router and the backup border router.

11. The method of claim 10, further comprising:
    mapping the hop of the backup path in response to determining that the backup border router is not the originating border router.

12. A non-transitory computer-readable storage medium including program instructions for causing a border router to perform at least:
    identifying, in response to receiving a label mapping message from a network node, a backup border router as a hop in a backup path between a leaf node and a root node in a multicast network including an autonomous system, the label mapping message including a type-length-value, the type-length-value including a system address of an originating border router having generated the label mapping message;
    examining the type-length-value to determine the system address of the originating border router;
    determining whether the backup border router is the originating border router based on the type-length-value; and
    suppressing mapping of the hop in the backup path in response to determining that the backup border router is the originating border router, wherein
    the backup border router is separate from the border router.

13. The non-transitory computer-readable storage medium of claim 12,
    wherein
    the determining determines whether the backup border router is the originating border router based on a comparison between the system address of the originating border router and a system address of the backup border router.

14. The non-transitory computer-readable storage medium of claim 12, wherein the determining comprises:
    determining that the system address of the originating border router matches a system address of the backup border router; and
    determining that the backup border router is the originating border router in response to determining that the system address of the originating border router matches the system address of the backup border router.

15. The non-transitory computer-readable storage medium of claim 12, further including program instructions for causing the border router to perform at least:
    identifying, in response to receiving the label mapping message, a primary border router as a hop in a primary path between the leaf node and the root node in the multicast network; and
    sending a label mapping message to only the primary border router from among the primary border router and the backup border router.

16. The non-transitory computer-readable storage medium of claim 12, further including program instructions for causing the border router to perform at least:
    mapping the hop of the backup path in response to determining that the backup border router is not the originating border router.

17. The non-transitory computer-readable storage medium of claim 12, further including program instructions for causing the border router to perform at least:
    identifying, in response to receiving the label mapping message, a primary border router as a hop in a primary path between the leaf node and the root node in the multicast network;
    sending a first label mapping message to the primary border router to map the hop in the primary path; and
    sending a second label mapping message to the backup border router to map the hop in the backup path.

* * * * *